United States Patent [19]
Suzuki

[11] Patent Number: 6,115,275
[45] Date of Patent: Sep. 5, 2000

[54] BRIDGE-TYPE INVERTER CIRCUIT WITH DELAY CIRCUIT

[75] Inventor: Sadanori Suzuki, Aichi, Japan

[73] Assignee: Kabushiki Kaisha Toyoda Jidoshokki Seisakusho, Kariya, Japan

[21] Appl. No.: 09/283,532

[22] Filed: Apr. 1, 1999

[30] Foreign Application Priority Data

Apr. 6, 1998 [JP] Japan .................................. 10-093497

[51] Int. Cl.[7] .......................... H02H 7/122; H02M 7/68; H02M 7/44
[52] U.S. Cl. .................. 363/98; 363/98; 363/58
[58] Field of Search ............................. 363/98, 132, 131, 363/95, 17, 58

[56] References Cited

U.S. PATENT DOCUMENTS

| | | | |
|---|---|---|---|
| 4,950,918 | 8/1990 | O'Breartuin et al. ................. | 307/242 |
| 4,964,158 | 10/1990 | Okochi et al. .......................... | 379/322 |
| 5,257,174 | 10/1993 | Ogiwara et al. ......................... | 363/36 |
| 5,536,920 | 7/1996 | Kwon ....................................... | 219/663 |

*Primary Examiner*—Peter S. Wong
*Assistant Examiner*—Bao Q. Vu
*Attorney, Agent, or Firm*—Morgan & Finnegan, L.L.P.

[57] ABSTRACT

A high frequency switching is performed while FETs 21 and 24, and FETs 22 and 23 are alternately switched on according to FET switching signals L and R. For example, a high frequency drive signal F is provided for transistors 31 and 32 through an OR gate 30 while FETs 22 and 23 are in an ON state, thereby alternately turning on and off the transistors 31 and 32 and driving the FET 22 at a high frequency. Similarly, a high frequency drive signal F is provided for two transistors through an OR gate while FETs 21 and 24 are in an ON state, thereby alternately turning on and off the two transistors and driving the FET 24 at a high frequency.

8 Claims, 5 Drawing Sheets

BRIDGE-TYPE INVERTER CIRCUIT WITH DELAY CIRCUIT

BACKGROUND OF THE INVENTION

1. Field of the Invention

The present invention relates to a bridge-type inverter circuit obtained by forming a switching unit in the shape of an H bridge.

2 Description of the Related Art

When a load of an AC motor, etc. is driven, it may be driven while adjusting a supplied voltage. In this case, a bridge-type inverter circuit obtained by connecting a switching element of a transistor, etc. to an H-shaped bridge is widely used. FIGS. 1 and 2 show an example of a bridge-type inverter circuit. FIG. 1 shows an example driven by 3 power sources while FIG. 2 shows an example driven by a single power source.

First, the bridge-type inverter circuit shown in FIG. 1 includes field-effect transistors (FET) 1 through 4, which are the first through fourth switching units, driven by corresponding drive circuits 1a through 4a. That is, independent drive signals 1b through 4b are respectively provided for the drive circuits 1a through 4a, and the corresponding drive circuits 1a through 4a are driven to alternately drive the FETs 1 and 4 and the FETs 2 and 3. Therefore, three power sources, that is, a direct current power source 5 for driving the drive circuit 1a, a direct current power source 6 for driving the drive circuit 3a, and a direct current power source 7 for driving the drive circuits 2a and 4a are used in this circuit.

On the other hand, the bridge-type inverter circuit shown in FIG. 2 drives the FETs 1 through 4 using a single drive power source, and drives a drive signal 8 (8a, 8b) at a high level (H level) and a low level (L level). For example, the circuit turns on the FET 2 through a resistor R1 when the drive signal 8a indicates the H level, turns on the FET 1 when the drive signal 8a indicates the L level. By repeating this process, the FETs 1 and 2 can be alternately turned on and off. The FETs 3 and 4 not shown in FIG. 2 can also be alternately driven according to the drive signal 8b. The drive signals 8a and 8b have an inverse relationship in output timing of the H level and the L level. That is, the FET 3 is turned on when the FET 2 is ON, and the FET 4 is turned on when the FET 1 is ON, thereby providing the electric power for an alternating current load not shown in FIG. 2.

In FIG. 2, when the drive signal 8a indicates the H level, a transistor 10 is turned on after being provided with a high-level signal through a resistor R4, and sets the FET 1 in an OFF state through the resistor R5. An electrolysis capacitor 11 accumulates an electric charge through a resistor 2 and a diode 9 when the drive signal 8a indicates the H level, and drives the FET 1 as described above when the drive signal 8a turns to the low level.

However, the following problems occur in the above described conventional circuit. First, the circuit shown in FIG. 1 requires three drive power sources 5 through 7, causing a costly device. The drive signals 1b through 4b are independent, and therefore it is difficult to control the signals to prevent the FETs 1 and 2, or 3 and 4 from being simultaneously turned on (to prevent a short circuit).

Similarly, it is important for the circuit shown in FIG. 2 to prevent a short circuit. Therefore, the switching speed of the FET cannot be set high. As a result, the above described circuit can control only up to several tens KHz. For example, a high frequency over a few hundred KHz cannot be controlled.

SUMMARY OF THE INVENTION

The present invention aims at providing a bridge-type inverter circuit capable of using a single drive power source to realize a high frequency drive.

That is, first through fourth switching units are connected in the form of a bridge. A load is connected between the connection point between the first and the second switching units and the connection point between the third and the fourth switching units. There is an inverse relationship in phase of a low frequency signal provided between the first and fourth switching units and the second and third switching units. An electric current passes through the first and fourth switching units, or the second and third switching units. During the above described process, a high frequency signal is provided for a switching unit being driven. Thus, when any switching unit is in the ON state according to a high frequency signal, an alternating current load is driven at a high frequency using a single drive power source, thereby realizing a bridge-type inverter circuit for high frequency drive using a single drive power source.

In addition, the above described high frequency signal can be provided by a high-speed capacitance unit, thereby providing a drive current required when high frequency drive is performed. Thus, more precise frequency drive can be realized by the bridge-type inverter circuit.

DESCRIPTION OF THE PREFERRED EMBODIMENTS

The embodiments of the present invention are described below in detail by referring to the attached drawings.

Figure 3:
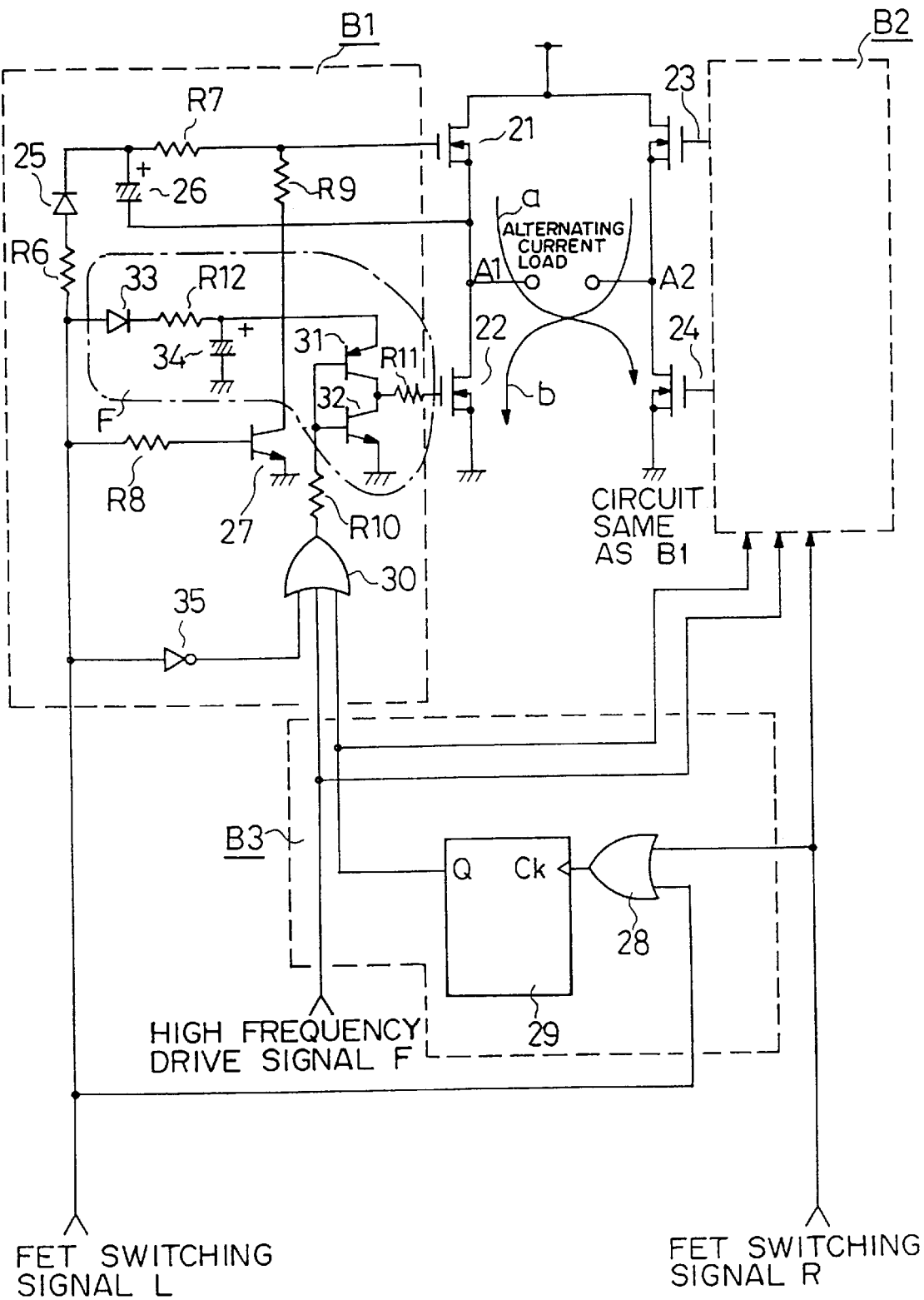
FIG. 3 shows a bridge-type inverter circuit according to the present embodiment.

FIG. 3 shows a drive circuit of a bridge-type inverter circuit according to the present embodiment. In FIG. 3, an FET 21 as the first switching unit is connected in series to an FET 22 as the second switching unit, and the connection point A1 is connected to one end of the alternating current load not shown in FIG. 3. Similarly, an FET 23 as the third switching unit is connected in series to an FET 24 as the fourth switching unit, and the connection point A2 is connected to the other end of the alternating current load not shown in FIG. 3. Therefore, a DC-AC converter used in the present embodiment is a bridge-type inverter circuit in which the FETs 21 and 22 are connected symmetrically about the above described alternating load to the FETs 23 and 24, and provides electric power for an alternating current load by alternately turning on and off the FETs 21 and 24, and the FETs 22 and 23.

A circuit B1 shown by dotted lines in FIG. 3 is a circuit for driving the FETs 21 and 22, and a circuit B2 whose configuration is omitted here is a circuit for driving the FETs 23 and 24. Since the circuit B2 is symmetrical to the circuit B1 in configuration, the detailed description is omitted here. A circuit B3 shown by dotted lines in FIG. 3 is a commonly used circuit.

When a circuit for providing a low frequency signal as a means for providing a low frequency signal provides a low frequency signal to the FET 21, a resistor R6, a diode 25, an electrolysis capacitor 26, a resistor R7, a resistor R8, a transistor 27, and a resistor R9 function. When it provides a low frequency signal for the FET 22, the above described circuit B3 (an OR gate 28, a one-shot flipflop (hereinafter referred to simply as a one-shot FF) 29), an OR gate 30, a resistor R10, a resistor R11, an inverter 35, etc. function. That is, when the FET switching signal (hereinafter referred to simply as a switching signal) L indicates the L level, the FET 21 is provided with the H level signal by the electric charge accumulated by the electrolysis capacitor 26 through the resistor R7, and is turned on and driven. When the switching signal L turns to the H level, the transistor 27 is turned on through the resistor R8, and the L level signal is provided for the gate of the FET 21 through transistor 27 and the resistor R9 to turn it off.

On the FET 22 side, when the switching signal L turns to the H level, an L level signal is provided for the OR gate 30 through the inverter 35. When the switching signal L turns to the L level, an H level signal is provided for the OR gate 30 through the inverter 35. When the switching signal L turns to the H level, the circuit B3 comprising the OR gate 28 and the one-shot FF 29 provides the H level signal for the OR gate 30 for a predetermined time. The circuit B3 is also used in driving the FETs 23 and 24. Therefore, it similarly functions even when the switching signal R turns to the L level. The above described predetermined time is set in the one-shot FF 29.

On the other hand, a first circuit for providing a high frequency signal as a first means for providing a high frequency signal provides a signal, the OR gate 30, the resistor R10, a transistors 31 and 32, and the resistor R11 function. A diode 33, a resistor R12, and an electrolysis capacitor 34 correctly maintain the driving speed when the FET 22 is driven at a high frequency. According to the present embodiment, the high frequency drive signal F is a signal for about a few hundred KHz, and is output to the OR gate 30. A one-shot signal can also be provided from the one-shot FF 29 to The OR gate 30, and the above described switching signal L can be provided to the OR gate 30 through the inverter 35. The output from the OR gate 30 is provided for the base of the transistors 31 and 32 through the resistor R10. Turning on or off depends on the output level of the OR gate 30, and the FET 22 is turned on or off through the resistor R11.

Furthermore, the electrolysis capacitor 34 is a high-speed capacitor for providing an emitter current for the transistor 31, accumulates the electric charge provided through the diode 33 and the resistor R12 when the transistor 31 is in the OFF state, and uses it as a supply current when the transistor 31 is turned on.

In the circuit B2, the same circuit as the circuit B1 is formed, and the circuits corresponding to the OR gate 30, the transistors 31 and 32, etc. function as a means for providing a high frequency signal.

The operations of the DC-AC converter with the above described configuration are described below.

First, the FETs 21 and 24 are turned on according to the switching signal L at the L level, and an electric current flows in a direction as shown in FIG. 3. In this state, when the switching signal L turns to the H level, the transistor 27 is turned on and the FET 21 is turned off.

On the other hand, when the switching signal L turns to the H level, an H level signal is provided for the one-shot FF 29 through the OR gate 28. As described above, the H level signal is provided for the transistors 31 and 32 through the OR gate 30 for a predetermined time. Then, the transistor 32 is turned on and the FET 22 is set in the OFF state. Therefore, the operation of the circuit prevents the FET 22 from being turned on before the FET 21 is turned off, thereby certainly avoiding a short circuit between the FET 21 and the FET 22.

After the above described predetermined time has passed, the output from the one-shot FF 29 indicates the L level, and an L level signal is provided for the transistors 31 and 32 through the OR gate 30, thereby turning on the transistor 31 and driving the FET 22. At this time, since the high-speed electrolysis capacitor 34 is connected to the emitter of the transistor 31, the electric charge accumulated by the electrolysis capacitor 34 is immediately provided, and the FET 22 is immediately turned on. Then, an electric current flows through the FET 22. At this time, an electric current b provided through the FET 23, which is set ON, flows.

On the other hand, the high frequency drive signal F is over a few hundred KHz as described above, and the high frequency drive signal F is provided as, for example, an H level signal for the OR gate 30 while the switching signal L indicates the H level (the switching signal R indicates the L level). According to the high frequency drive signal F, the output of the OR gate 30 becomes the H level again, thereby turning on the transistor 32 and setting the FET 22 in the OFF state. Therefore, the operation of the circuit stops the flow of the above described electric current b. During the process, an electric charge is accumulated again in the electrolysis capacitor 34.

When the high frequency drive signal turns to the L level, an L level signal is provided through the OR gate 30, thereby turning on the transistor 31 and driving the FET 22. At this time, an electric current is immediately provided from the electrolysis capacitor 34 as described above, and the FET 22 is driven.

Then, according to a high frequency drive signal F over a few hundred KHz, the FET 22 is repeatedly turned on and off. During the process, since the FET 23 is set in the ON state by the operations of the circuit at the circuit B2, the electric current b continually flows through the FETs 22 and 23. Therefore, a drive current can flow through an alternating current load according to the high frequency drive signal.

When the switching signal L turns to the L level, an H level signal is input to the OR gate 30 through the inverter 35, thereby turning on the transistor 32 and turning off the FET 22. In addition, the transistor 27 is turned off when the switching signal L turns to the L level, an H level signal is provided for the FET 21 by the electric charge accumulated by the electrolysis capacitor 26, and the FET 21 is turned on. However, since the resistor R7 used in the present embodiment is designed as comprising a high resistor (for example, a few hundred KΩ), the FET 21 is not immediately turned on, but is turned on only after the above described electric current b is certainly stopped. Therefore, a short circuit can be avoided by preventing the FETs 21 and 22 from being simultaneously turned on.

After the FET 21 is turned on, the FET 24 is driven at a high frequency by the operation of the circuit B2 as described above, the FET 24 is repeatedly turned on and off, and a high-frequency alternating current is provided for an alternating current load.

Then, the switching signal L turns to the H level again, and the above described process is repeated. The circuit B2 also repeats the process according to the switching signal R, and continually provides an electric current at a high frequency for an alternating current load. Furthermore, according to the present embodiment, a single drive power source is used to realize high frequency drive.

According to the present embodiment, an FET is used as the first through fourth switching units. However, the switching unit is not limited to the FET, and a switching unit such as an IGBT, etc. can be applied.

In addition, a low frequency signal is not limited to a few tens KHz, and a high frequency drive signal is not limited to a few hundred KHz.

Figure 1:
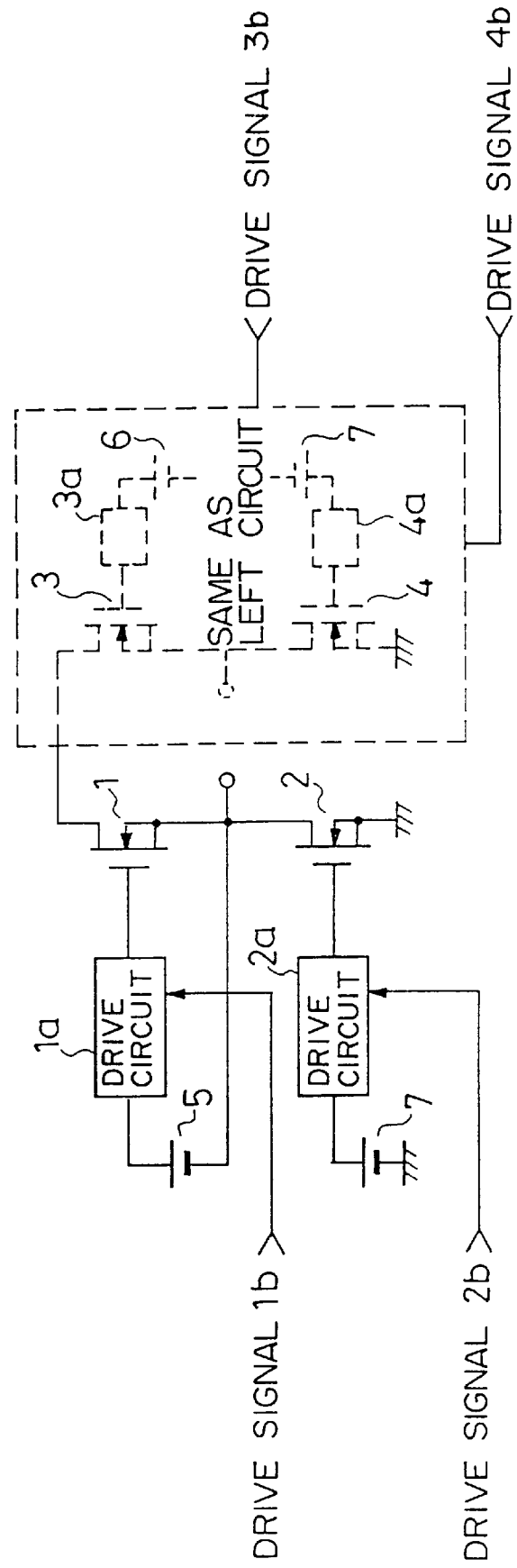
FIG. 1 shows a 3 power source drive circuit.

Furthermore, a low frequency signal providing circuit and a high frequency signal providing circuit are not limited to the circuits shown in FIG. 1. That is, it is necessary only to perform a process of turning on and off according to a high frequency signal while the second or fourth switching unit is turned on according to a low frequency signal. The simplest example is to provide a low frequency signal and a high frequency signal for the second or fourth switching unit through an AND gate.

Figure 2:
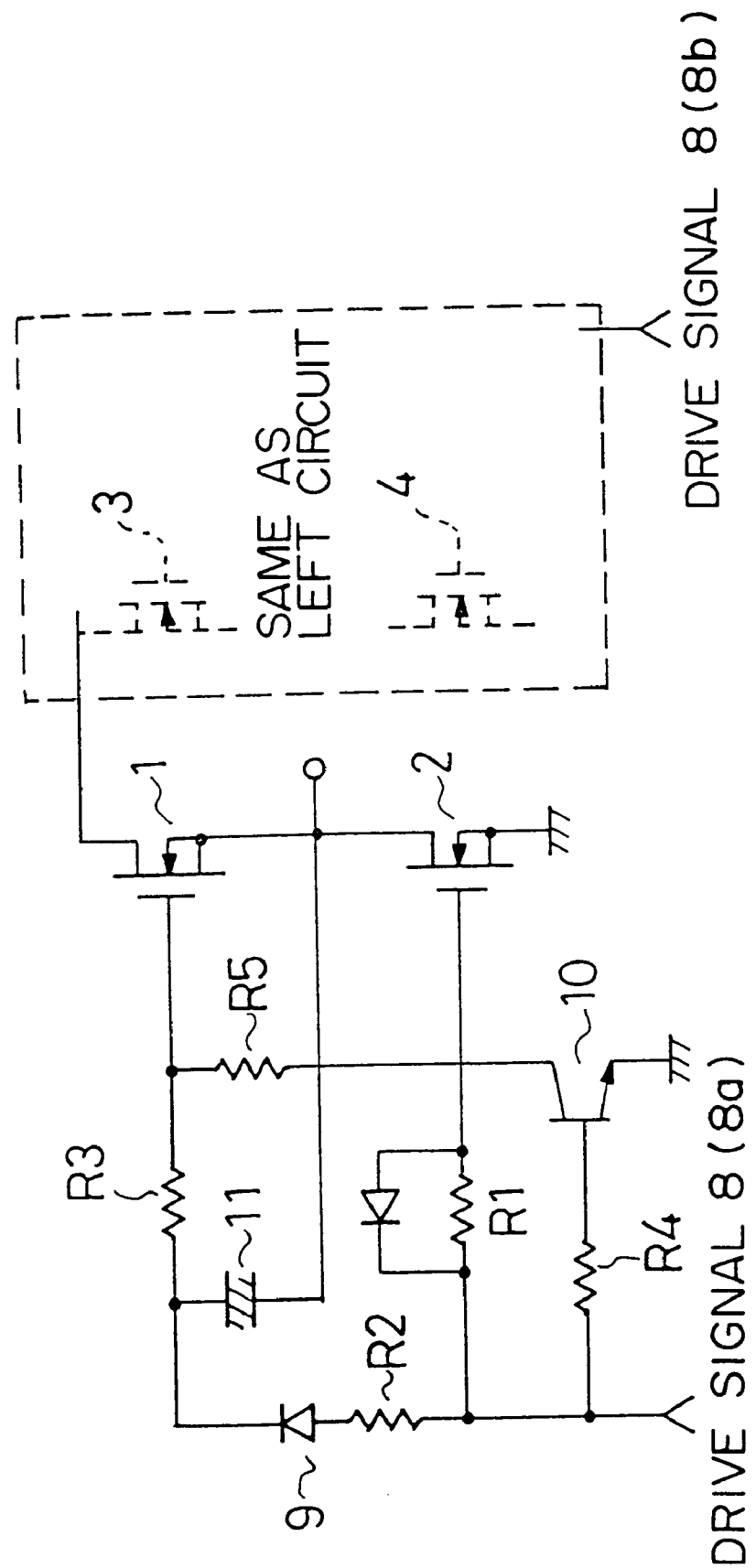
FIG. 2 shows a single power source drive circuit.
Figure 4:
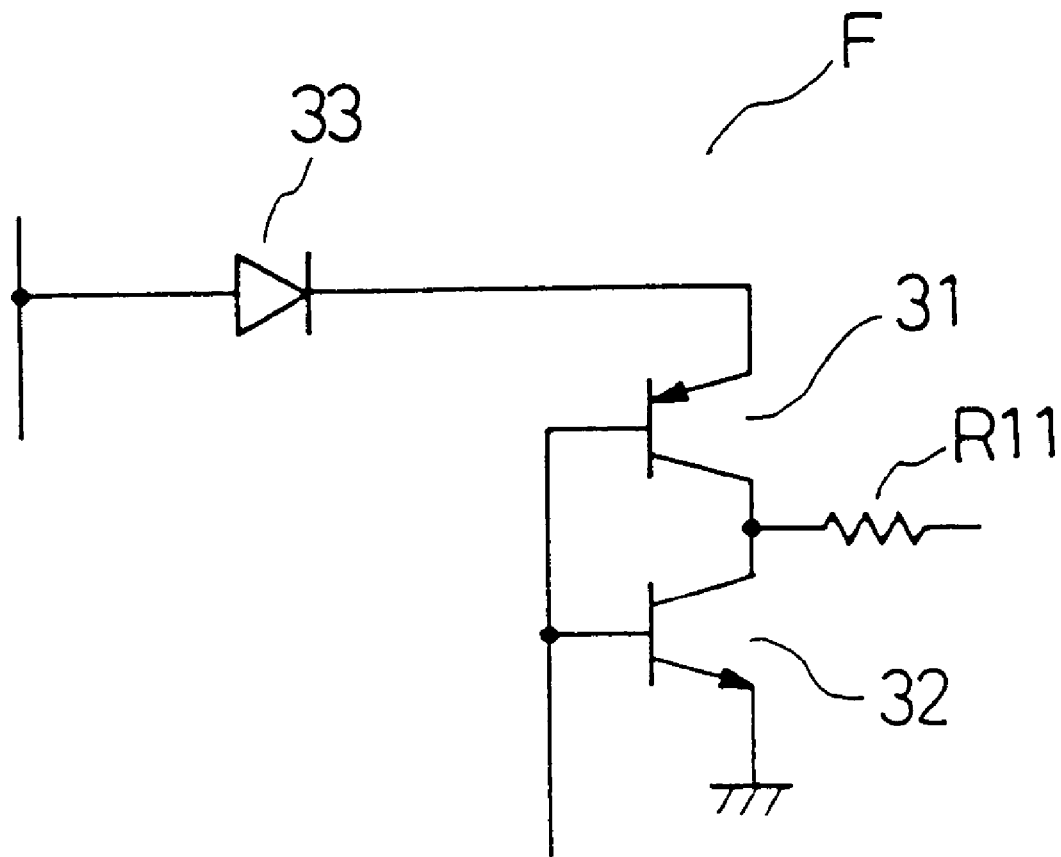
FIG. 4 shows the detail of the part F shown in FIG. 3, and a variation of the present embodiment.

The high-speed electrolysis capacitor 34 used in the high frequency signal providing circuit is not required if the output impedance at the terminal of the switching signal L (switching signal R) is small enough. In this case, a simpler circuit can be designed as shown in FIG. 2. FIG. 4 shows the part F shown in FIG. 3.

Figure 5:
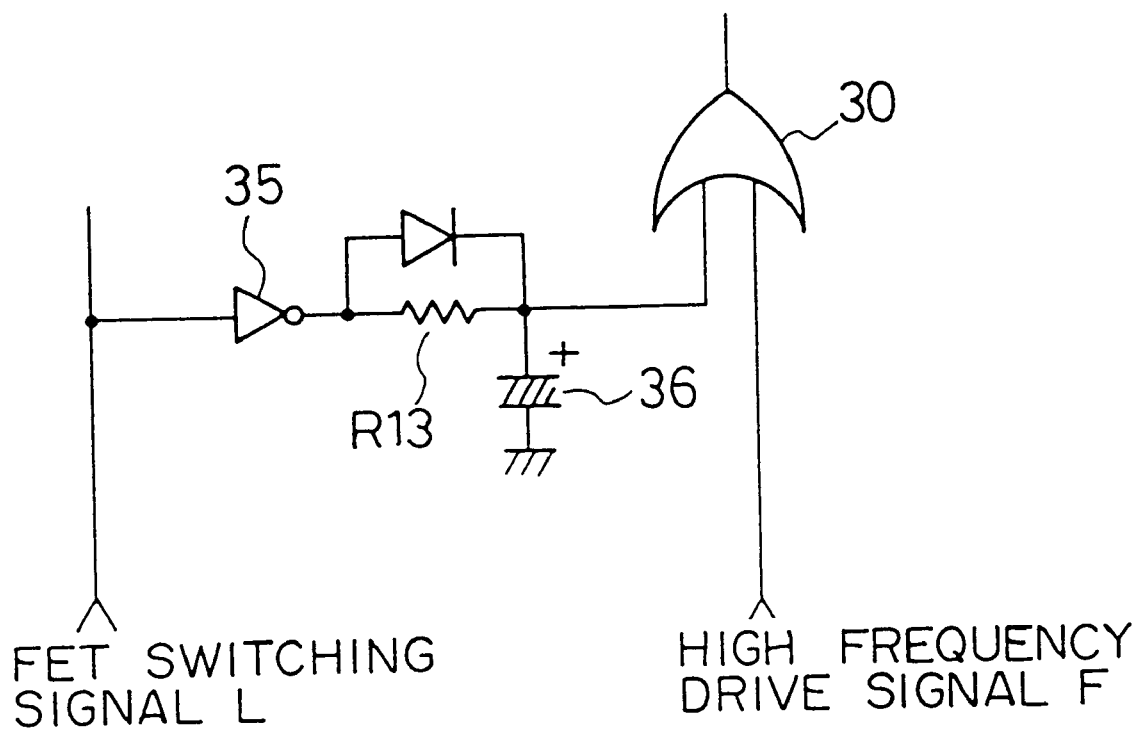
FIG. 5 shows the configuration of a delay circuit, that is, a circuit replacing the circuit B3.

The delay circuit shown in FIG. 5 can replace the circuit B3. In the circuit B3, the output of the switching signal L (switching signal R) is delayed for a predetermined time by the one-shot FF 29. However, the circuit B3 can be omitted by providing the delay circuit shown in FIG. 5 with the above described inverter 35. That is, the circuit shown in FIG. 5 can replace the circuit B3 by setting a time constant by a capacitor 36 and a resistor R13 to the above described predetermined time.

It is obvious that both circuits shown in FIGS. 4 and 5 can be applied in the present embodiment.

As described above in detail, the present invention provides a bridge-type inverter circuit capable of realizing a high frequency switching using a single drive power source.

Furthermore, high frequency drive can be guaranteed using a high-speed capacitor.

What is claimed is:

1. A bridge-type inverter circuit in which a load is connected between a connection point between a first switching unit and a second switching unit, and a connection point between a third switching unit and a fourth switching unit, said first and second switching units are connected symmetrically to said third and fourth switching units about the load, all said switching units are driven by a mono power source, comprising:

low frequency drive signal providing means for providing a low frequency drive signal indicating an inverse relationship between said first and fourth switching units and said second and third switching units;

delay means for delaying supply of a low frequency drive signal when said low frequency drive signal providing means provides the low frequency drive signal;

first high frequency drive signal providing means for providing a high frequency drive signal for said second switching means when the second switching means is driven according to the low frequency drive signal; and second high frequency drive signal providing means for providing a high frequency drive signal for the fourth switching means when the fourth switching means is driven according to the low frequency drive signal, wherein said delay means delays a turning-on operation of one of said first and fourth switching means and said second and third switching means for a predetermined time at a starting stage of switching a low frequency signal.

2. The circuit according to claim 1, wherein said first high frequency drive signal providing means and said second high frequency drive signal providing means are provided with transistor circuits for alternately outputting a high level signal and a low level signal according to a corresponding high frequency drive signal and low frequency drive signal.

3. The circuit according to claim 1, wherein high-speed capacitance means is connected to said first high frequency drive signal providing means and said second high frequency drive signal providing means.

4. A bridge-type inverter circuit in which a load is connected between a connection point between a first switching element and a second switching element, and a connection point between a third switching element and a fourth switching element, said first and second switching elements are connected symmetrically to said third and fourth switching elements about the load, all said switching units are driven by a mono power source, comprising:

low frequency drive signal providing means for providing a low frequency drive signal indicating an inverse relation ship between said first and fourth switching elements and said second and third switching elements;

delay circuit for delaying supply of a low frequency drive signal when said low frequency drive signal providing means provides the low frequency drive signal;

first high frequency drive signal providing circuit for providing a high frequency drive signal for the second switching means when the second switching means is driven according to the low frequency drive signal; and second high frequency drive signal providing circuit for providing a high frequency drive signal for the fourth switching means when the fourth switching means is driven according to the low frequency drive signal, wherein said delay means delays a turning-on operation of one of said first and fourth switching means and said second and third switching means for a predetermined time at a starting stage of switching a low frequency signal.

5. A bridge-type inverter circuit in which a load is connected between a connection point between a first switching unit and a second switching unit, and a connection point between a third switching unit and a fourth switching unit, said first and second switching units are connected symmetrically to said third and fourth switching units about the load, all said switching units are driven by a mono power source, comprising:

low frequency drive signal providing means for providing a low frequency drive signal indicating an inverse relationship between said first and fourth switching units and said second and third switching units;

delay means for delaying supply of a low frequency drive signal when said low frequency drive signal providing means provides the low frequency drive signal;

high frequency drive signal generation means for generating a high frequency drive signal for use in driving the second switching unit and the fourth switching unit at a high frequency;

means for providing the second switching unit with a signal corresponding to a logical product of a low frequency drive signal and a high frequency drive signal; and means for providing the fourth switching unit with a signal corresponding to a logical product of a low frequency drive signal and a high frequency drive signal, wherein said delay means delays a turning-on operation of one of said first and fourth switching means and said second and third switching means for a predetermined time at a starting stage of switching a low frequency signal.

6. The circuit according to claim 1, wherein said delay means comprises a one-shot flip flop and a high resistance element.

7. The circuit according to claim 4, wherein said delay circuit comprises a one-shot flip flop and a high resistance element.

8. The circuit according to claim 5, wherein said delay means comprises a one-shot flip flop and a high resistance element.

* * * * *

UNITED STATES PATENT AND TRADEMARK OFFICE
CERTIFICATE OF CORRECTION

PATENT NO. : 6,115,275  
DATED : September 5, 2000  
INVENTOR(S) : Sadanori Suzuki et al.

Page 1 of 1

It is certified that error appears in the above-identified patent and that said Letters Patent is hereby corrected as shown below:

<u>Column 6,</u>  
Line 23, please change "signal" to -- circuit --;  
Line 24, please change "relation ship" to -- relationship --.

Signed and Sealed this

Twenty-sixth Day of March, 2002

Attest:

Attesting Officer

JAMES E. ROGAN  
*Director of the United States Patent and Trademark Office*